United States Patent [19]

Gilbert

[11] Patent Number: 5,458,390
[45] Date of Patent: Oct. 17, 1995

[54] SOFT TOP

[76] Inventor: Randy B. Gilbert, 5-2861 Craigowan Road, Victoria, B.C., Canada, V9B 1M9

[21] Appl. No.: 220,154

[22] Filed: Mar. 30, 1994

[30] Foreign Application Priority Data

Apr. 1, 1993 [CA] Canada ................................ 2093153

[51] Int. Cl.⁶ ..................................................... B60J 7/10
[52] U.S. Cl. ........................................ 296/78.1; 296/107
[58] Field of Search ..................................... 296/102, 104, 296/105, 107, 109, 77.1, 78.1; 114/361; 135/88, 89, 107, 25.33; 280/288.4

[56] References Cited

U.S. PATENT DOCUMENTS

| | | | |
|---|---|---|---|
| 2,162,347 | 6/1939 | Haberstump | 296/121 |
| 3,244,251 | 4/1966 | Duncan | 296/102 X |
| 3,284,130 | 11/1966 | Michael | 296/78.1 |
| 3,743,345 | 7/1973 | Eckman et al. | 135/107 X |
| 4,336,964 | 6/1982 | Pivar | 296/78.1 X |
| 4,440,436 | 4/1984 | Giddens et al. | 296/78.1 X |
| 4,681,362 | 7/1987 | Taylor | 296/78.1 |
| 4,805,654 | 2/1989 | Wang | 135/88 |
| 4,950,017 | 8/1990 | Norton | 296/77.1 |
| 4,973,082 | 11/1990 | Kincheloe | 296/78.1 X |
| 5,072,987 | 12/1991 | Allen | 296/78.1 X |

FOREIGN PATENT DOCUMENTS 230610 5/1923 Canada.
258953 6/1926 Canada.

*Primary Examiner*—Dean Kramer
*Attorney, Agent, or Firm*—Sughrue, Mion, Zinn, Macpeak and Seas

[57] ABSTRACT

A retrofittable, removable enclosure assembly for a motorcycle, capable of use at and below highway speeds is provided. The enclosure assembly includes first and second pairs of detachable upright supports adapted to be substantially rigidly coupled to a forward and rearward guards of a motorcycle, a disassemblable frame element forming a rectangular tubular frame having forward and rearward pairs of supports adapted to removably engage respective detachable supports, a pair of angular supports adapted to removably and slidably engage the rectangular frame and the rearward pair of supports. A fabric cover component is adapted to be removably affixed to the rectangular frame and the windshield of the motorcycle. The fabric cover can be employed to provide top, top and front protection or to enclose the entire passenger region of the motorcycle. The enclosure assembly is also provided in a kit form.

16 Claims, 9 Drawing Sheets

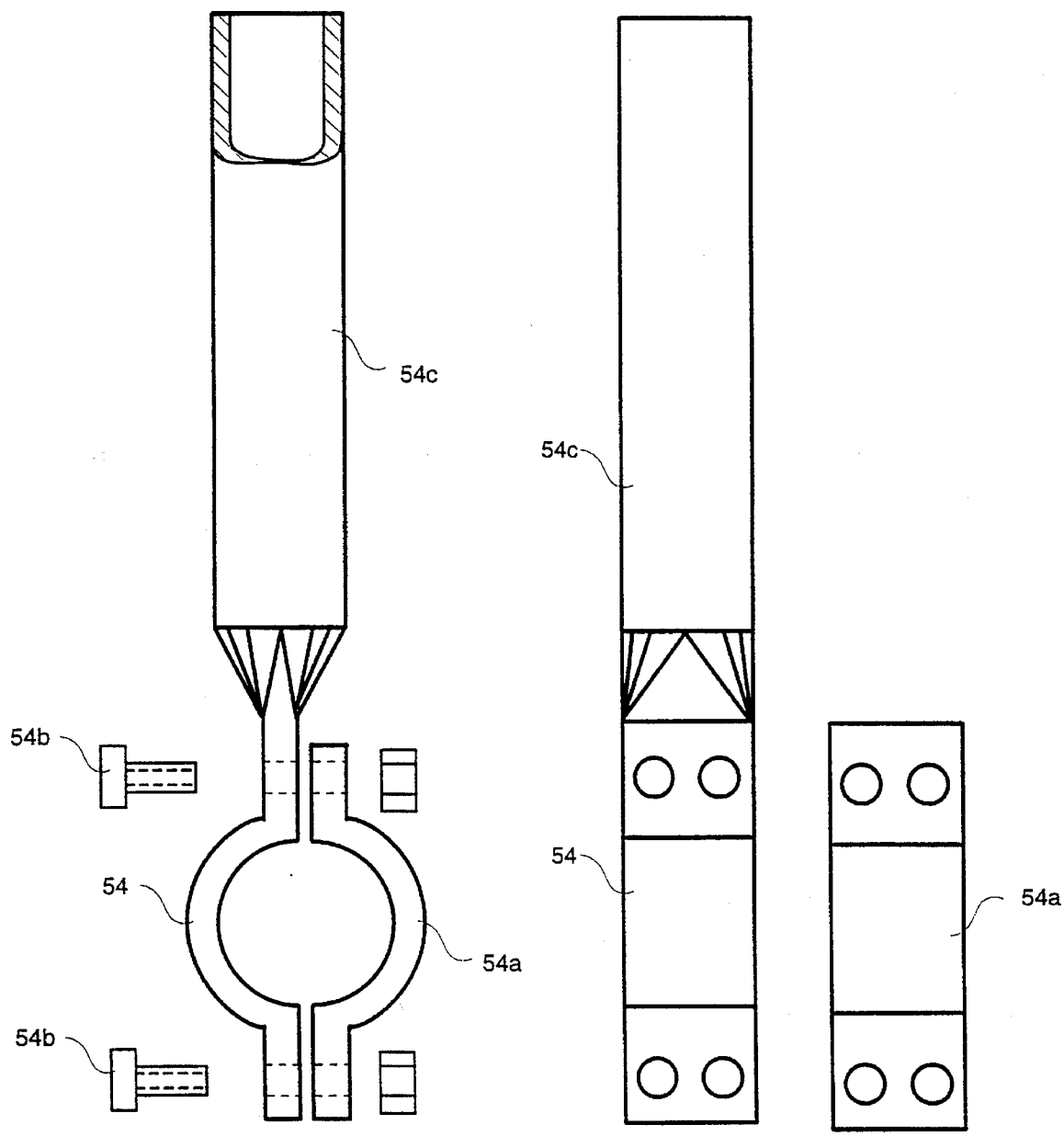
*Fig. 3*  *Fig. 3a*

SOFT TOP

FIELD OF THE INVENTION

This invention relates to the field of removable cover assemblies for motorcycles. More specifically, the invention relates to removable cover assemblies for motorcycles provided with full fairings and for use at highway speeds.

BACKGROUND TO THE INVENTION

The terms "touring bikes" and "touring motorcycles" as used herein are intended to refer to those motorcycles which are provided with a full, frame-mounted fairing, either as original equipment or on a retrofit basis.

The term "fairing" as used herein refers to those types of fairings which are considered in the art to be "full" fairings as opposed to those understood to be "partial" fairings.

The term "highway speed" as used herein refers to those speeds generally recognised as being from about 50 kilometers per hour up to the legal Canadian speed limit of 100 KpH. Of course, maximum highway speeds differ from country to country, but the present invention is satisfactory for use at even higher speeds.

Motorcycles have been, and are still employed extensively for providing light, economical and fast conveyance for one or two passengers at a time, for both local and long distance travel. In order to obtain the advantages of this mode of travel, however, the passengers often must sacrifice comfort, or resort to expensive, cumbersome and restrictive wet and cold weather clothing for protection, or in fact refrain from travelling altogether, especially in inclement weather such as during rain and snow storms, or for very sunny days (of growing concern is increased UV radiation from sunlight, and without a form of cover, riders can be subjected to long periods of exposure), as there is no provision made in their design for a covering assembly. This has probably been due to such factors as the size of the vehicle, and other factors such as stability, and the range of speeds at which they are often used, such as from in-city to highway speeds. With the advent of the so-called "touring bikes" long distance pleasure cruising has become more popular for both young and old, in spite of the above-mentioned drawbacks.

It would therefore be desirable to enhance the range of weather in which touring bikes and the like can be comfortably utilized, by providing a removable cover assembly.

Various removable cover assemblies are- known for vehicles. For example, U.S. Pat. No. 4,950,017 discloses one such assembly for all-terrain vehicles (ATV's). This cover assembly is limited to a front and top only and is strictly limited to use at very low speeds as no consideration of aerodynamics is required for use on ATV's. In addition, the ATV must be modified to allow the cover assembly to be attached. The cover assembly disclosed is therefore not suitable for use with highway speed motorcycles, nor could it readily be altered to be so.

Canadian Industrial Design No. 56204 discloses another type of cover assembly, which provides both top and side coverage for an ATV. As the design includes an open front, it can not practically be adapted to highway speed motorcycles.

SUMMARY OF THE INVENTION

It is therefore an object of the present invention to provide a removable enclosure assembly for a motorcycle which substantially overcomes the above-noted disadvantages.

According to an aspect of the present invention, the is provided a removable enclosure assembly for a motorcycle, said enclosure assembly comprising: first and second pairs of upright support members adapted for being substantially rigidly coupled to a forward and rearward portion of a motorcycle; a disassemblable first frame element forming a rectangular tubular frame, said rectangular frame having forward and rearward pairs of downwardly depending support means, each of said support means adapted to removably engage respective said support members and said rectangular frame; a pair of angular support means adapted to removably and slidably engage said rectangular frame and said rearward pair of downwardly depending support means; a top cover component adapted to be removably affixed to said rectangular frame and a windshield of said motorcycle; wherein said enclosure assembly is adapted for use at up to and including highway speeds.

Another aspect of the present invention provides a removable enclosure assembly for a motorcycle, said enclosure assembly comprising: first and second pairs of upright support members adapted for being substantially rigidly coupled to a forward and rearward portion of a motorcycle; a disassemblable first frame element forming a rectangular tubular frame, said rectangular frame having forward and rearward pairs of downwardly depending support means, each of said support means adapted to removably engage respective said support members and said rectangular frame; a pair of angular support means adapted to removably and slidably engage said rectangular frame and said rearward pair of downwardly depending support means; a top cover component adapted to be removably affixed to said rectangular frame and a windshield of said motorcycle; wherein said enclosure assembly is adapted for use at up to and including highway speeds.

A further aspect of the present invention provides the combination comprising: a motorcycle which includes front and rear wheels, an engine driving the rear wheel, a two person saddle type seat, a frame mounted full fairing, a curved windshield, a handlebar assembly operatively connected to, and serving to steer the front wheel, engine guards disposed on either side of said engine and rear baggage guards disposed on either side of said motorcycle, and a removable enclosure assembly for a motorcycle, said enclosure assembly comprising: first and second pairs of upright support members adapted to being substantially rigidly coupled to said engine guards and said baggage guard of the motorcycle respectively; a disassemblable first frame element forming a rectangular tubular frame provided with a transverse member, said rectangular frame having a forward and rearward pair of downwardly depending support means, each of said support means adapted to removably engage respective said support members and said rectangular frame; a pair of angular support means adapted to removably and slidably engage said rectangular frame and said rearward pair of downwardly depending support means; a top cover component adapted to be removably affixed to said rectangular frame and a windshield of said motorcycle; wherein said enclosure assembly is adapted for use at up to and including highway speeds.

Thus, the present invention affords an aerodynamically designed cover system for a motorcycle that provides virtually no negative impact on such aspects as motorcycle stability, performance and fuel consumption.

The cover assembly of the present invention is conveniently embodied in kit form provided with individual components which can be installed onto and removed from a motorcycle and can be employed using a roof section alone, a roof and front sections together, or a roof and front sections in conjunction with a third section providing complete enclosure.

BRIEF DESCRIPTION OF THE DRAWINGS

The invention will be more readily understood from the following description of a preferred embodiment thereof given, by way of example, with reference to the accompanying drawings, in which:

FIGS. 3 and 3a show detail of the frame mounting;

DETAILED DESCRIPTION OF A PREFERRED EMBODIMENT

Figure 1:
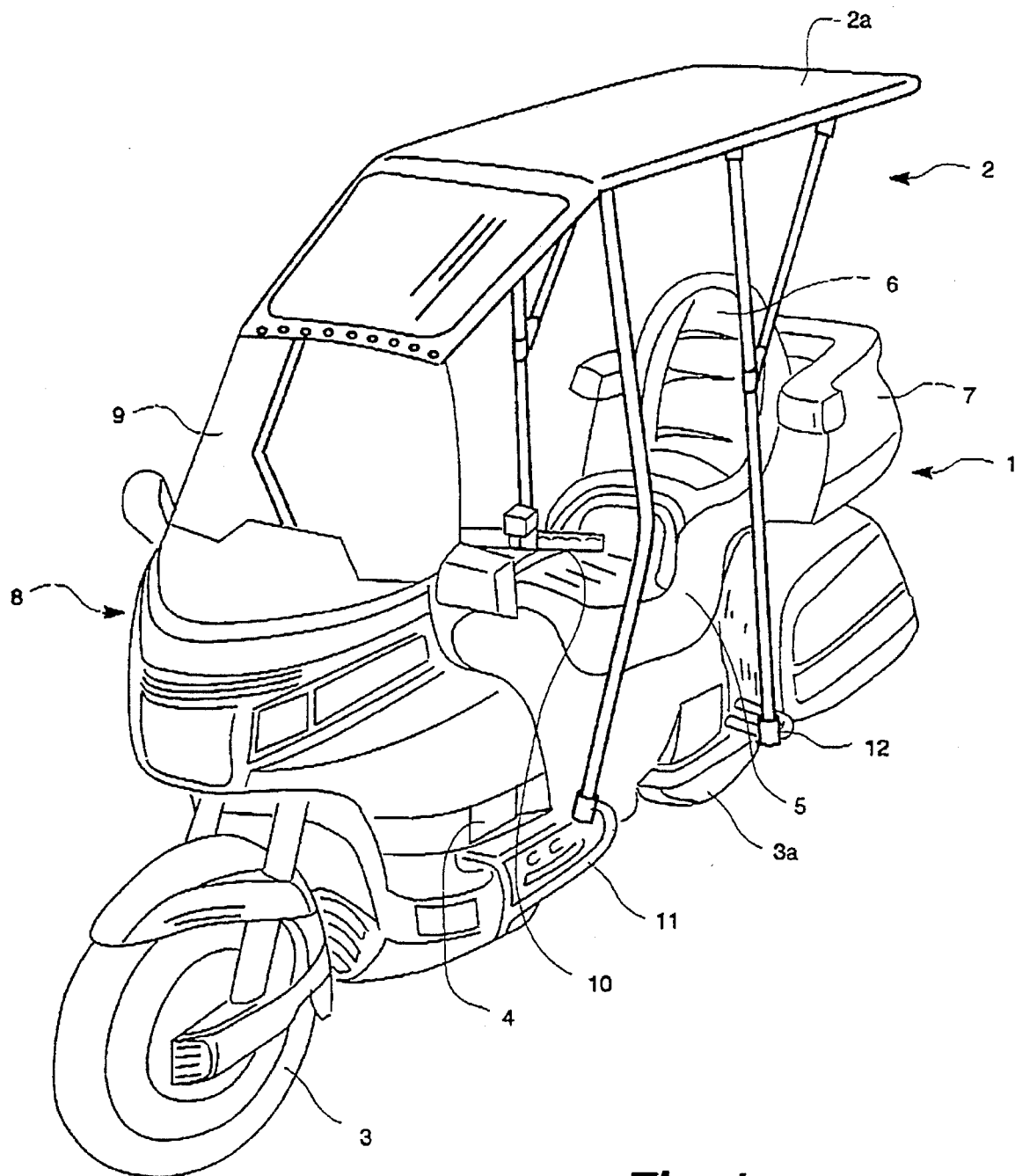
FIG. 1 is a perspective view of an embodiment of the roof mode of the present invention deployed on a motorcycle.
Figure 1A:
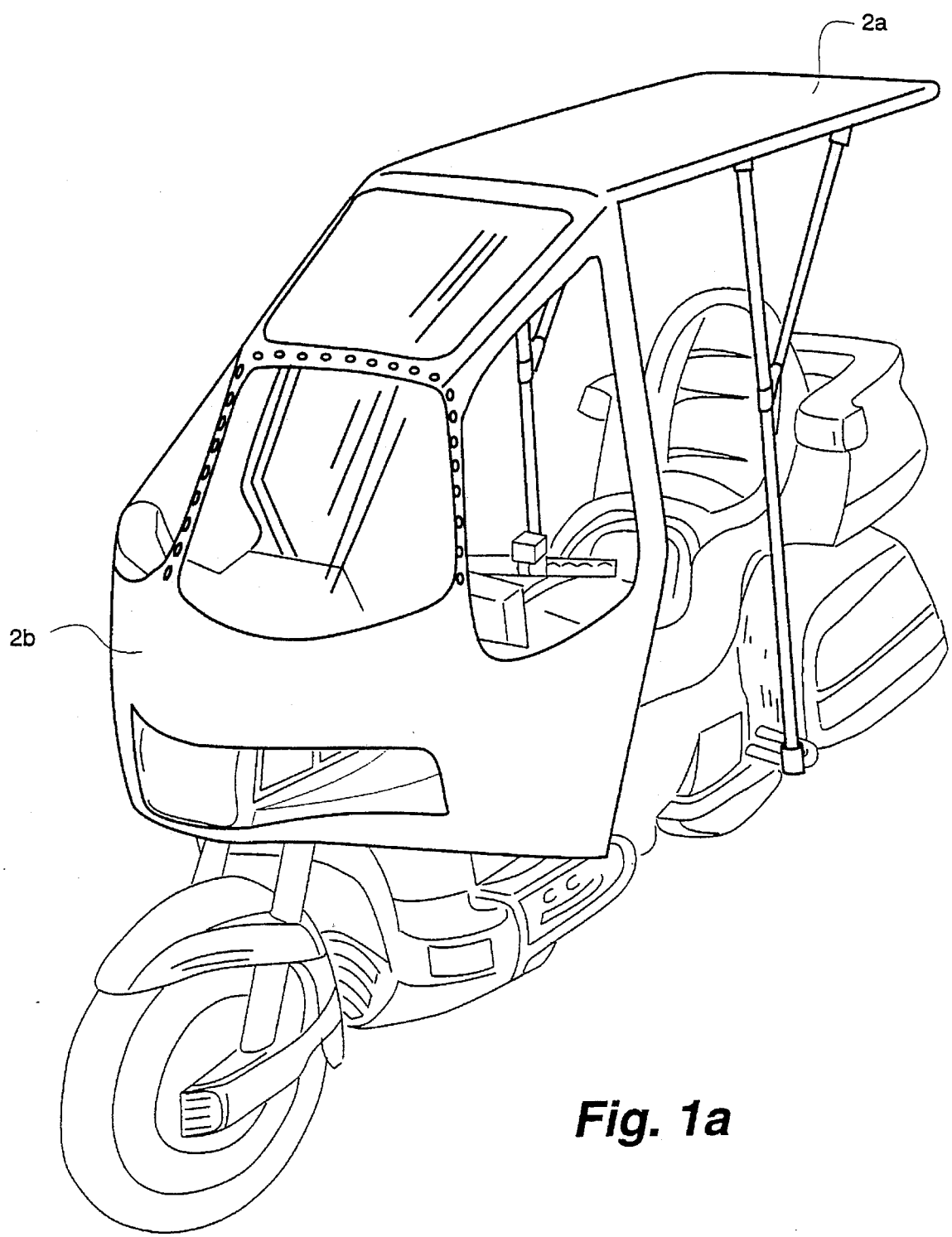
FIG. 1a is a perspective view of an embodiment of the front section mode of the present invention.
Figure 1B:
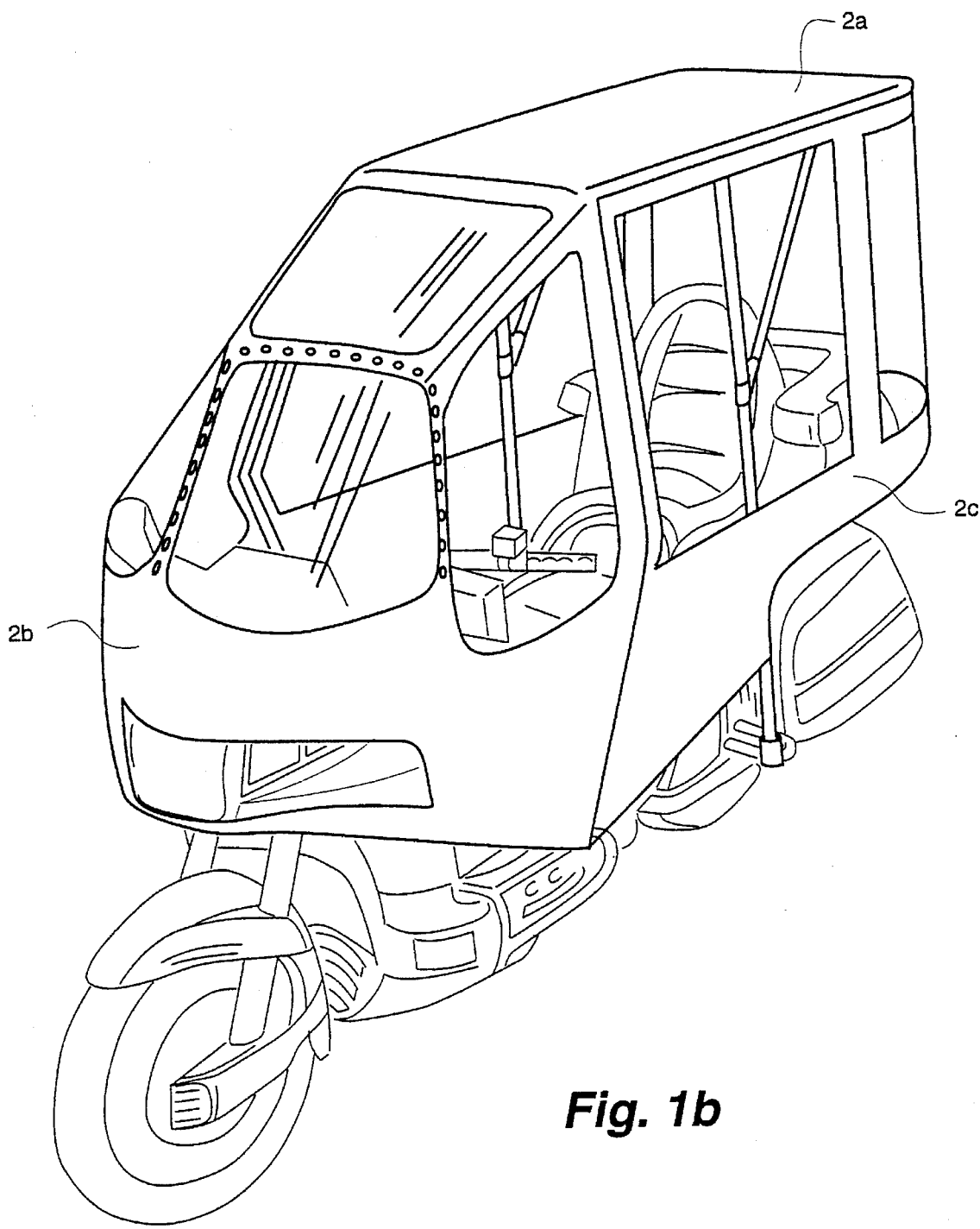
FIG. 1b is a perspective view of an embodiment of the closure mode of the present invention.

Having regard first to FIGS. 1, 1a and 1b, a touring style motorcycle 1 is shown with a removable cover assembly 2 according to various modes of the present invention. FIG. 1 shows the motorcycle having only the roof section 2a deployed. FIG. 1a shows the motor cycle having the roof section 2a and front section 2b deployed. FIG. 1b shows the enclosing section 2c applied to FIG. 1a, thereby enclosing the motorcycle.

The motorcycle 1 includes front and rear wheels 3, and 3a respectively, an engine 4 driving the rear wheel 3a, a one or two person saddle type seat 5 wherein the operator is situated above and behind the engine and a passenger can be positioned behind the operator and supported in part by a backrest 6 having a trunk 7 located behind. Turning to the front of the motorcycle, there is located a frame-mounted full fairing 8 from which side view mirrors among other things are mounted, a curved windshield 9, and a handlebar assembly 10 which is operatively connected to, and serves to steer the front wheel 3 in addition to having the throttle, clutch and/or brake controls in typical motorcycle relationship. Disposed on both sides of the motorcycle at the front are engine guards 11, and in the rear, rear baggage guards 12. As is typical to motorcycles, a kickstand 13 is provided to support the motorcycle in a generally vertical position when not in use.

Figure 2:
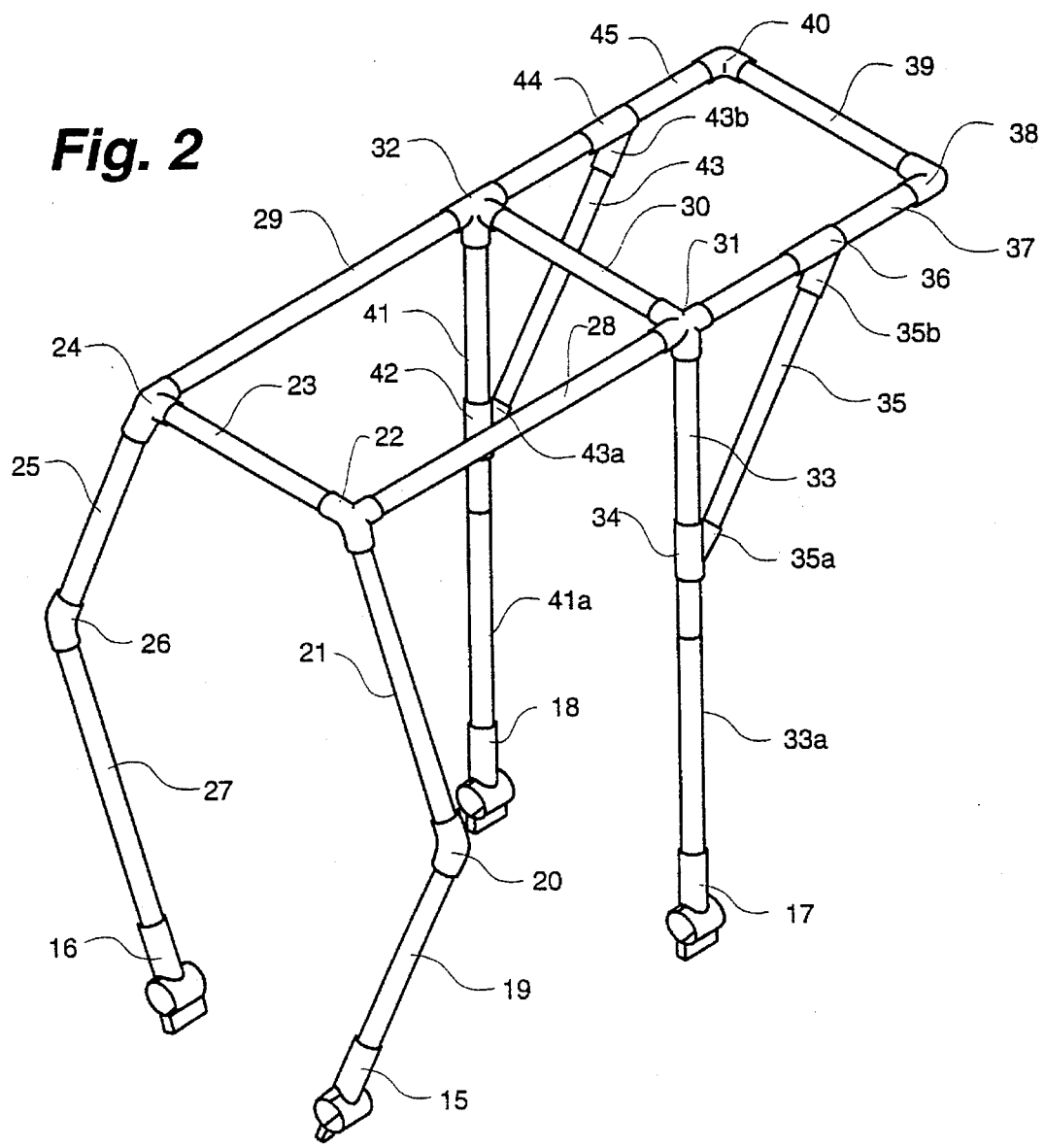
FIG. 2 shows the frame of the present invention.
Figure 2B:
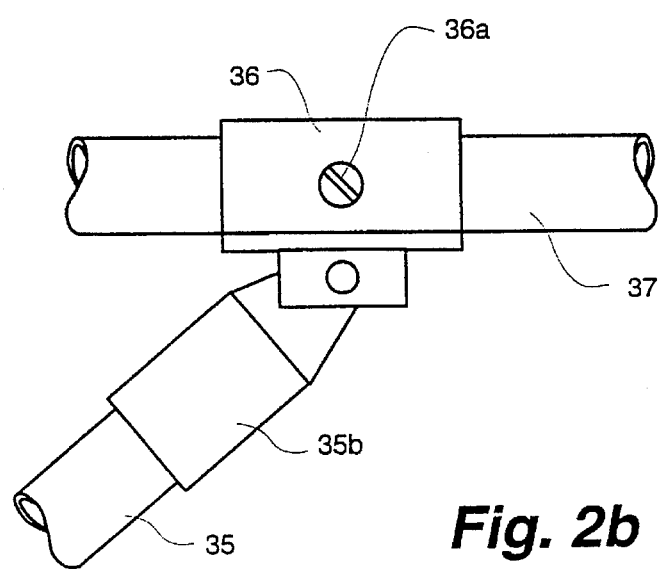
FIG. 2b shows a detailed aspect of FIG. 2.
Figure 2A:
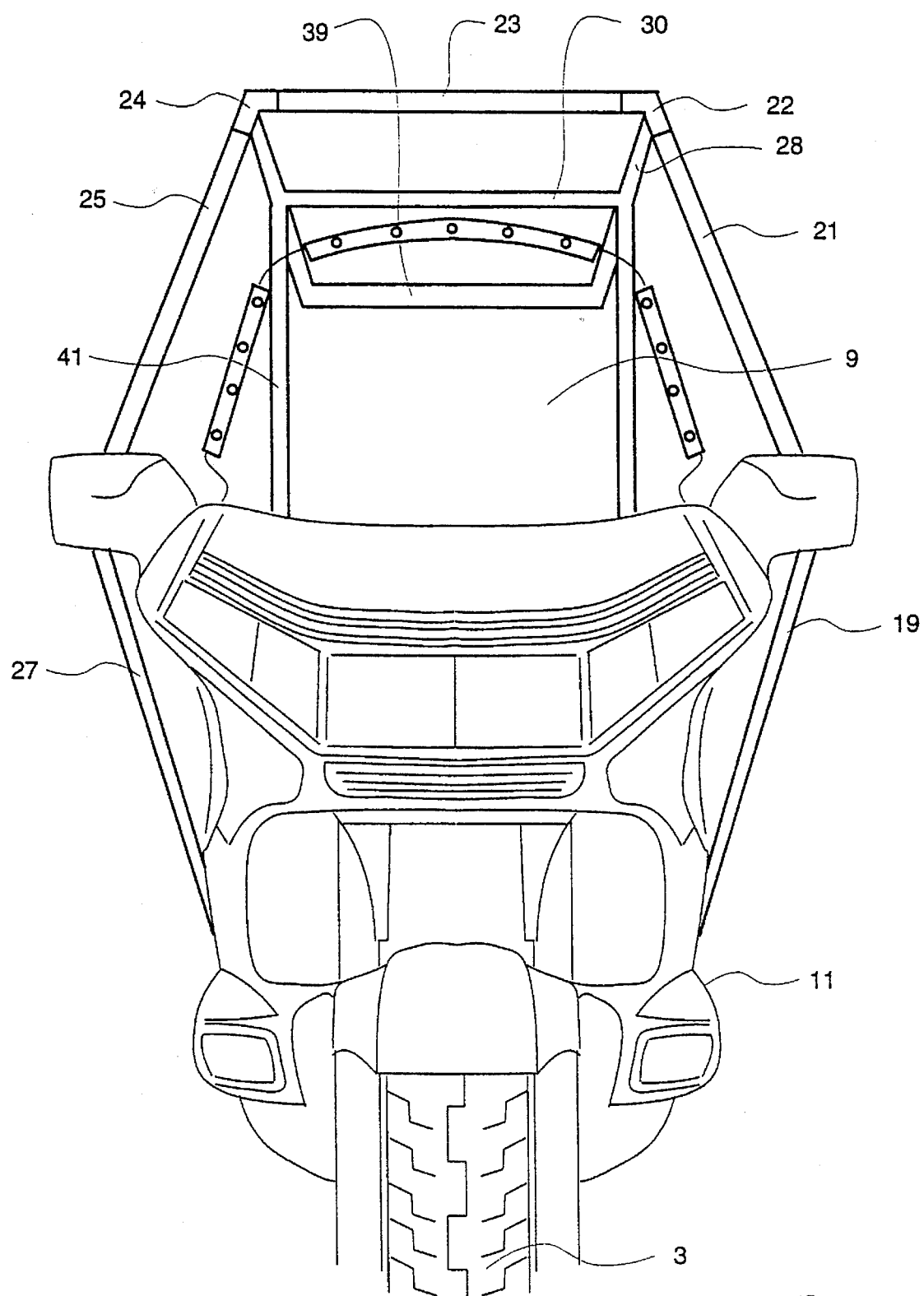
FIG. 2a shows the frame of FIG. 2 disposed on a motorcycle.

Individual components comprising the frame of the removable cover assembly of this invention are shown more clearly in FIGS. 2, 2a and 2b, where FIG. 2 is a perspective view from the left side of the assembled frame and 2a is a near head-on perspective view. The frame comprises essentially three primary elements, the first frame element generally comprising a generally rectangular frame provided with a transverse member. The first frame element is assembled from seven elongate tubular members removably affixed to corner brackets. When positioned on a motorcycle, tubular member 23 extends transversely across the motorcycle from corner bracket 22 and terminates in corner bracket 24. Extending rearwardly from brackets 22 and 24 are elongate tube members 28 and 29 which terminate in four-way brackets 31 and 32 respectively. Disposed parallel to tube member 23 and terminating in four-way brackets 31 and 32 is tube member 30, which provides mid-frame support and rigidity. Extending rearwardly from four-way brackets 31 and 32 and coaxially from tube members 28 and 29 are tubular members 37 and 45 which terminate in corner brackets 38 and 40 respectively. Corner brackets 38 and 40 are spaced apart by tube member 39 which is parallel to both tube members 23 and 30. Slidably affixed on the members 37 and 45 are slide brackets 36 and 44 each provided with hinge elements, as is shown in greater detail in FIG. 2b. The hinge element 35b disposed on tubular member 35 engages the mating hinge element disposed on the slide bracket 36. This structure is typical of the four slide bracket-hinge element groups, namely 34-35a, 36-35b, 42-43a, and 44-43b. The slide brackets are fixed into position during use by fastening means 36a (typical) which may be screws wing nuts or similar fastening apparatus.

Depending downwardly from corner brackets 22 and 24 and four-way brackets 31 and 32 are the tubular support means that support the rectangular frame above a motorcycle. Turning firstly to the forward pair of support members, tubular members 21 and 25 extend downwardly and outwardly from corner brackets 22 and 24 respectively, and terminate in elbow brackets 20 and 26 respectively. Extending inwardly and downwardly from the elbow brackets 20 and 26 are tubular members 19 and 27 respectively, which terminate at their lower end in mounting brackets 15 and 16 respectively. The mounting brackets 15 and 16 are removably affixed to the engine guard of either side of the motorcycle.

Depending downwardly from four-way brackets 31 and 32 are the second pair of support members. Extensible tubular members 33/33a and 41/41a extend downwardly from the corner brackets 31 and 32 and terminate in mounting brackets 17 and 18 respectively, which are removably affixed to the rear baggage guards disposed on either side of the motorcycle. Extensible tube members 33/33a and 41/41a can be fabricated from tubes having swaged ends so that member 33a inserts into the lower end of member 33 and locks into position using spring-lock assembly, or fabricated so that an end portion of tube member 33a inserts into tube member 33 and is locked into position by means of a compression locking nut. In an alternative embodiment, they may comprise a true "telescoping" type of tubular arrangement.

Movably disposed thereon members 33/33a and 41/41a are brackets 34 and 42 respectively, each further having provided first hinge elements 34a and 42a respectively. Extending upwardly and rearwardly from the brackets 34 and 42 are tube members 35 and 43 having affixed to both ends each, second hinge elements 35a and 43a respectively. Second hinge elements 35a of member 35 co-operatively engage the first hinge element 34a and the first hinge element 36a respectively thereby supporting tube element 35. Of course, the situation is the same for tube 43, second hinge elements 43a and first hinge elements 42a and 44a. Tubular elements 35 and 43 provide support for the tubular arrangement 37-39-45 and serve to stiffen the entire structure against deformation under wind pressure. To assist in erection of the cover, bracket 34, tube member 35, bracket 36 and tube member 37 can be an integral unit as is discussed in greater detail below.

Extensible tube members 33/33a and 41/41a allow for reduced length to aid in portability of the kit when stored, and for quick and hassle free assembly when being deployed, as in one embodiment, they telescope out and lock at their correct length. While the members shown utilize a spring locking assembly similar to the type found for instance, on vacuum cleaners, those skilled in the appropriate art will recognise that other types of so-called " tubular quick-acting" clamps can also be used, provided they supply the structural integrity required under the envisaged load conditions.

The mounting brackets 15, 16, 17, and 18, as shown in FIGS. 3 and 3a can be fabricated from a two-part clamp having parts 54 and 54a that are placed around the tubular engine guard 11 or rear baggage guard 12 and fasten together by means of nuts and bolts 54b. A short tubular extension piece 54c is adapted so that first frame element members 19 and 27 and corresponding third frame element members 33/33a and 41/41a are insertable. Additionally, the surfaces of the clamp can have disposed on them a material such as rubber or plastic so as not to scratch or damage the guards. Of course, clamp designs other than shown can be utilized to attach the removable cover assembly, so long as they meet essentially the same desiderata as those shown.

Figure 4A:
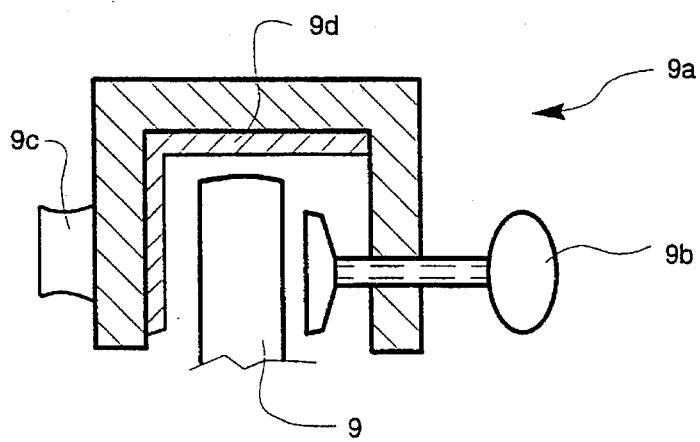
FIG. 4 and 4a show aspects of one embodiment of a windshield fastening means according to the present invention.
Figure 4:
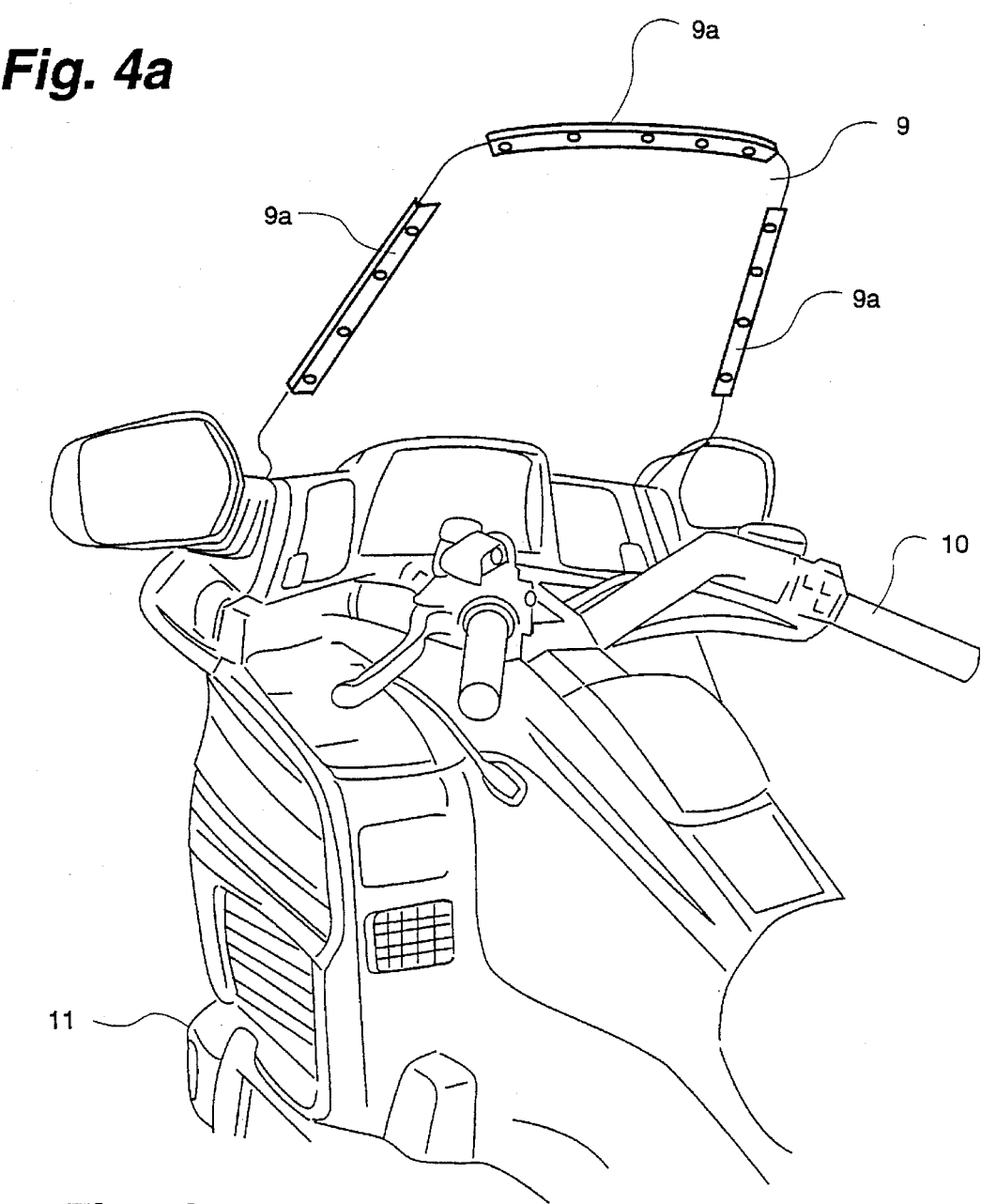

Turning now to FIGS. 4 and 4a, there is shown in FIG. 4, removably affixed to windshield 9, a plurality of U-channel shaped sleeves 9a, preferably three in number, placed in top, left and right positions, which serve to secure portions of both roof section 2 and front section 2a to the wind shield, and in FIG. 4a, a cross sectional detail of certain aspects of the sleeves 9a. The sleeves 9a are adapted to fit the various curves of the windshield 9, and are affixed thereto by means of a plurality of screw clamps 9b located on one side of the sleeve. Located opposite each clamp 9b is the first half of a button snap 9c. Lining the inside of the sleeve 9a is a buffer material 9d adapted to provide a flexible, protective surface with which to grip the outer edges of the windshield 9. The buffer material 9d is selected from materials such as felt-type materials and/or non-sliding rubber-types such as silicone rubber. Depending upon the material chosen, additional gripping purchase can be achieved without undo stressing of the clamps 9b. The sleeves can be removed when not being used or alternatively, be left in place. Alternatively, the first snap portions 9c can be permanently mounted on the windshield by mounting them directly into the plastic of the windshield.

Figure 5:
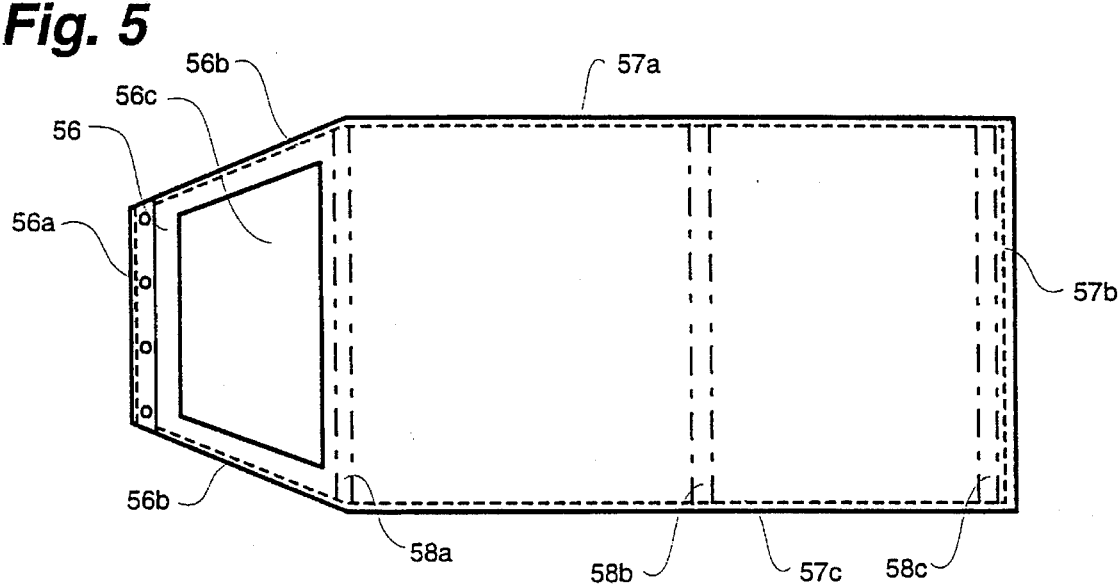
FIGS. 5 and 5a show top and bottom plans view of the roof section.
Figure 5A:
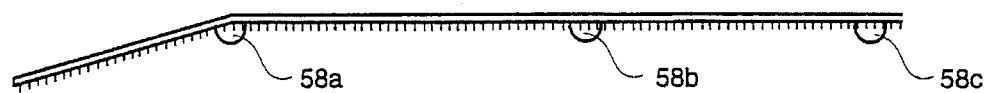

Turning now to FIGS. 5 and 5a, there is shown the roof or top section 2 in top plan and side views. As will be noted from the drawing, the roof section 2 comprises essentially a rectangular sheet of appropriate material, having a generally truncated triangular element 56 extending from one end. The truncated peak of the triangular element 56 is provided with a plurality of second snap elements 56a adapted to cooperate with button snaps 9c of windshield sleeves 9a.

Two sides of the triangular element 56 are provided with fastening means 56b respectively, which can comprise Velcro™ strips or zipper elements for instance, and disposed within the center region is a window element 56c consisting of a transparent polymer sheet, or similar material forming a window. Bordering the remaining perimeter of the rectangular sheet is one half of a zipper fastener 57a, 57b and 57c, or alternatively, this may be several individual zippers placed around the perimeter of the sheet thus providing security against rupture of a singular zipper element. The underside of the roof portion is further provided with attachment elements 58a, 58b and 58c which may be straps or sleeves and operate in concert with tubular members 23,30 and 40 respectively. When the fastening elements 58a, 58b and 58c are straps, they are passed around the corresponding tube member and fastened. When the fastening elements are fabricated in the form of sleeves, the appropriate tubular member is passed through them at the appropriate time during erection.

Figure 6:
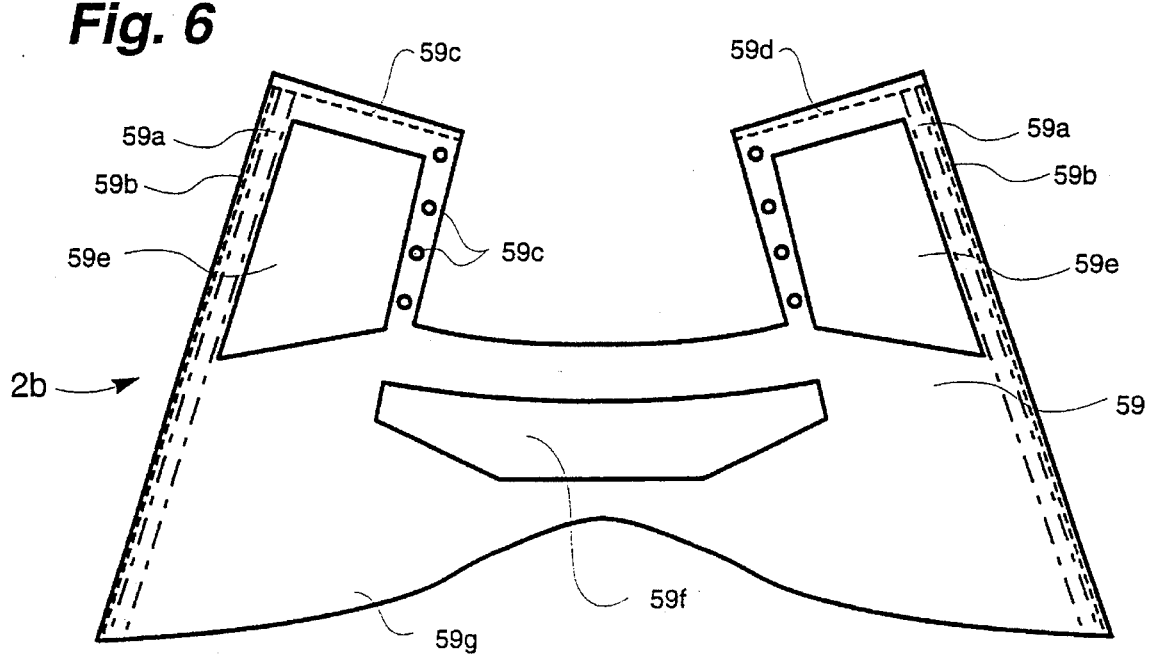
FIG. 6 shows a plan view of the front panel.

FIG. 6 shows the front section or "bra" section 2b in plan view. The front section 2b is essentially C-shaped and drapes around the front of the motorcycle and to either side of the wind shield and is fastened to the first frame element members 19-20-21 and 25-26-27 by means of snaps and straps 59a disposed on the sides, and to the windshield 9 by means of snaps 59c which cooperate with button snaps 9b of windshield sleeves 9. The upper edges of the bra are provided with fastening elements 59d which cooperatively fasten to zipper elements 56b of the triangular element 56 of the top 2. Zippers 59b are provided at both sides to work cooperatively with the side and back section when it is installed.

The bra section 2b is further provided with a plurality of windows 59e for use by the operator. Transparent portion 59f allows the operation of both the headlights and turn signal indicators to be observed by those the motorcycle is approaching or following. The entire bottom edge 59g of the bra and the area around the mirrors is sculpted to the contours of the front of individual styles of the motorcycles it is to be used on and aids in achieving the overall aerodynamics of the cover assembly.

Figure 7:
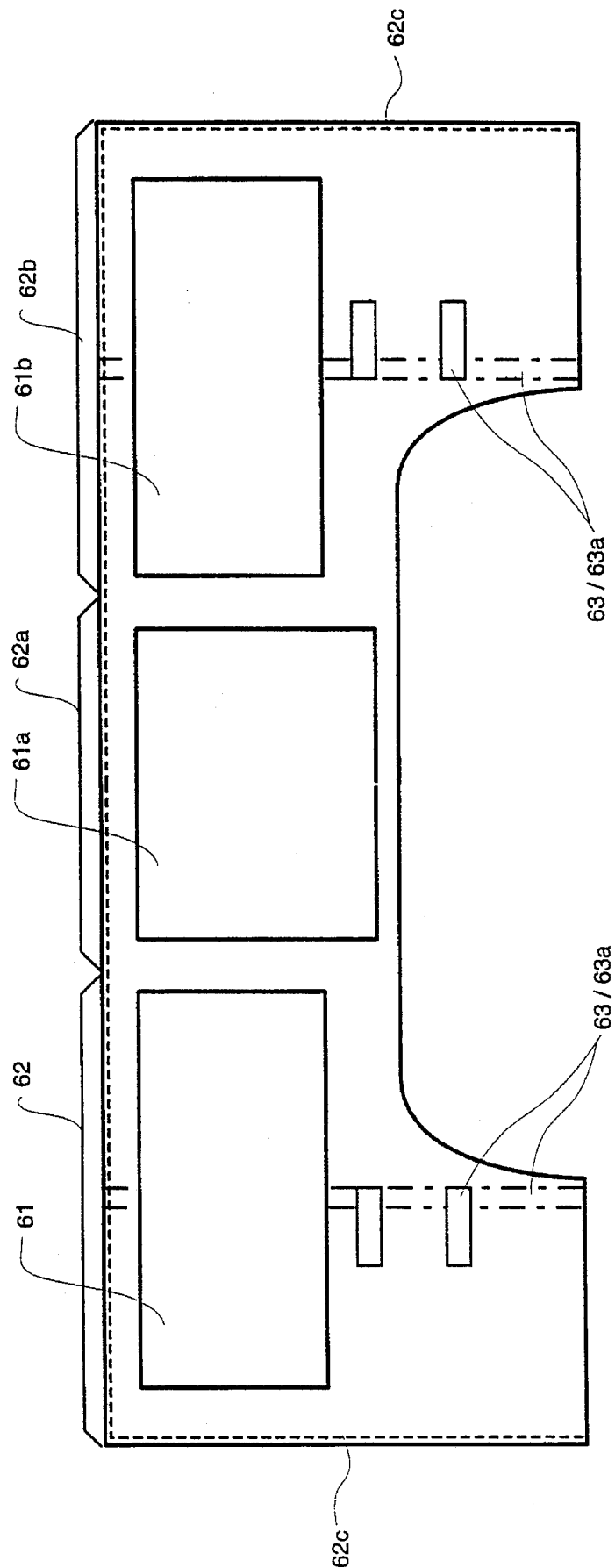
FIG. 7 shows a plan view of the side and rear portions.

FIG. 7 shows the enclosure or side and back section 2c in plan view. The closure or side and rear section 2c essentially comprises the side and rear panels and provides three large window elements 61, 61a and 61b, and is fastened to the roof section 2a by means of a zipper 62 or similar fastener. Snaps and/or loops 63 serve to attach the enclosure section to appropriate points on the frame, namely tubular members 33/33a and 41/41a. Zipper elements 62c serve to attach the enclosure section to the front bra section 2b at the frame elements 19-20-21 and 27-26-25, on both sides. These zippers close from the top down thereby providing a door for entry and exit. The enclosure section is not fastened at the lower edge between the vertical frame elements so as to permit ease of leg movement during operation of the motorcycle while providing at least mid-calf and higher protection.

The procedure for erecting the removable cover assembly can be carried out in many different ways, and, so long as the result is consistent with a safe outcome.

In order to expedite erection of the removable cover assembly, it can be provided in kit form wherein certain elements are provided in pre-assembled form. For example, the following elements can be conveniently pre-assembled:

1) 20-21
2) 22-28
3) 31-37-36-38, and were 36 has 35-34 attached
4) 25-26
5) 24-29
6) 32-45-44-40, and were 44 has 43-42 attached.

To erect the removable cover assembly of the present invention, starting with the above-noted elements preassembled, the four base mounting brackets 15, 16, 17, and 18 are attached to the left and right engine guards 11 and left and right rear baggage guards 12. As these brackets are chrome-plated and weather proof, they may be either removed after use, or left permanently installed to facilitate and speed future assembly.

The lowermost ends of tubular elements 19, 27, 33a, and 41a are then locked into the support brackets 15, 16, 17 and 18 as shown in FIGS. 2 and 2a. Tubular elements 20-21 and 25-26 are inserted into brackets 19 and 27 respectively. Tubular element sleeve assemblies 33/33a and 41/41a are extended and locked so, as indicated earlier. Extended elements 33/33a and 41/41a are then inserted into mounting brackets 17 and 18 respectively.

Brackets 34 and 42 are positioned on and temporarily affixed to members 33 and 41 respectively with the screws attached to brackets 34 and 42, and members 37 and 45 are locked into brackets 31 and 32 respectively. Small reference marks on members 33 and 41 indicate the approximate positions at which brackets 34 and 42 should be affixed. Member 23 is inserted into brackets 22 and 24 respectively and locked into position. Member 30 is then inserted into brackets 31 and 32 respectively and locked into position, and member 39 is inserted into brackets 38 and 40 respectively and locked into position. After ensuring that the frame is adequately squared off, re-adjust brackets 34 and 42 and lock into position. The frame is now assembled.

As a built in safety feature, the covering is designed as three separate sections, and accordingly, provides three separate modes of enjoyment. Once the frame has been installed, the invention can be employed by using the top section only, by using the top in combination with the front section, or by installing all three sections. This prevents the possibility of any adverse "parachute" effects or other aerodynamic problems from arising if one where to use only the front section or front and closure sections alone or together.

The top section 2a is installed by laying the material over the now erected frame top (23,28,29,30,37,39 and 45). Using securing means such as velcro, snaps or tabs, fastener 58a is secured to member 23, the fastener 58b is attached to member 30 and fastener 58c is attached to member 39. Front snaps 56a are fastened to windshield snaps 9b at the top of the windshield. The top is now securely fastened to the frame.

Should the operator desire increased protection from the wind or wind born particles without being totally enclosed, or to assist in quick installation in rapidly changing weather, the bra or front section can be installed, thus leaving only the side and rear portion to be installed when needed.

If the left and right windshield sleeves 9a have not been installed previously, they are installed now in a fashion as indicated earlier. The bra 2b is placed over the front of the motorcycle and the left and right fastening snaps 59c of the bra 2b are coupled with the snaps 9c of the left and right windshield sleeves 9a. The zippers 59d located above the window elements 59e are coupled with the mating zipper elements 56b of the top section 2a. Using the fasteners 59a which can comprise Velcro strips, snaps and tabs or other securing means, the sides of the bra are fastened to the frame elements 19-20-21 on the one side and frame elements 25-26-27 on the other. The bra section 2b is now safely and effectively secured to the motorcycle and assists in the aerodynamics thereof. As indicated earlier, the lower portion 59g of the bra 2b is custom contoured to fit the particular style and shape of a predetermined motorcycle fairing.

When installed, the side and rear portion 2c provides complete enclosure of the passenger area from the weather. To install, zipper section 62a is attached to the top section zipper 57 or 57b depending upon the embodiment. Zipper portions 62 and 62b are attached to the corresponding top zipper section 57 or 57a and 57c. The fasteners 63 and 63a are secured to the upright sections 33/33a and 41/41a. Front zippers 62c are closed after the driver and rider have taken their respective seats, thus sealing the enclosure.

The coverings 2a, 2b and 2c are fabricated from textile having durability, weatherproofness (either inherent or applied) such as natural fibre materials such as canvas, cotton ducking, or artificial fibre materials such as Nylon™ or Gortex™. Of course other materials can be used provided they meet the desiderata of being tough, and wind and waterproof while being flexible enough to be able to be rolled up for storage. The frame tubular members may be fabricated from aluminum or steel tubing and the connecting members fabricated of cast aluminum or similar readily cast metal suitable for the purpose. Those knowledgeable in the art will be aware of numerous materials that the frame and connecting members can be fabricated from that will satisfactorily fulfil the criteria of being strong, reasonably lightweight, economical and readily tooled.

The cover assembly of the present invention can be provided as a retrofit to a motorcycle by means of a kit, which can be reduced to a convenient size for transporting on a motorcycle. Alternatively, the cover assembly can be provided as original equipment on a motorcycle and may be provided in such fashion as to be disassemblable and storable for transport on the motorcycle as in kit fashion.

As those skilled in the art will recognize, there are many ways in which the invention presented herein can be effected without departing from the scope of the present invention.

I claim:

1. A removable enclosure assembly for a motorcycle, capable of use at and below highway speeds, said enclosure assembly comprising:

first and second pairs of upright support members adapted for being substantially rigidly coupled to a forward and rearward portion of a motorcycle;

a disassemblable first frame element forming a rectangular tubular frame, said rectangular frame having forward and rearward pairs of downwardly depending support means, each of said support means adapted to removably engage respective said support members and said rectangular frame;

a pair of angular support means adapted to removably and slidably engage said rectangular frame and said rearward pair of downwardly depending support means;

a top cover component adapted to be removably affixed to said rectangular frame and a windshield of said motorcycle;

a front cover component adapted to be removably affixed to the windshield of a motorcycle, said rectangular frame and said forward pair of downwardly depending support means; and a side and rear cover component adapted to be removably affixed to said rectangular frame, said forward and rearward pair of downwardly depending support means, and said frontal cover component.

2. The enclosure assembly of claim 1, wherein each said cover component comprises weather proof fabric material provided with fastening means and further provided with transparent portions at predetermined locations.

3. The enclosure assembly of claim 1, wherein said downwardly depending support means comprise extensible tubular members.

4. The enclosure assembly of claim 1, wherein said rectangular frame, said downward depending support means, and said angular support means disassemble to members of predetermined lengths.

5. The enclosure of claim 1 wherein said rectangular frame comprises a plurality of elongate tube members of predetermined length connected by means of removable coupling elements.

6. A kit capable of being assembled to provide a removable enclosure assembly for a motorcycle capable of use at and below highway speeds, said kit comprising:

first and second pairs of upright support members adapted to be substantially rigidly coupled to a forward and rearward portion of a motorcycle;

a disassemblable first frame element forming a rectangular tubular frame;

a forward and a rearward pair of support means, each of said support means being capable of being disposed in downwardly depending manner and adapted to removably engage respective support members and said rectangular frame;

a pair of angular support means adapted to removably and slidably engage said rectangular frame and said rearward pair of downwardly depending support means;

a top cover component adapted to be removably affixed to said rectangular frame;

attachment means to attach said cover component to a windshield;

a transparent front cover component adapted to be removably affixed to said attachment means, said rectangular frame and said forward pair of downwardly depending support means; and transparent side and rear cover components adapted to be removably affixed to said rectangular frame, said forward and rearward pair of downwardly depending support means, and said front cover component.

7. The kit as in claim 6, wherein each said cover component comprises weatherproof fabric material provided with at least one fastening means and further provided with one or more transparent portions at predetermined locations.

8. The kit as in claim 7 wherein said fastening means are selected from the group consisting of buttons, zippers, button snaps, velcro fasteners and belt and buckle fasteners.

9. The kit as in claim 6, wherein said downwardly depending support means comprise extensible tubular members.

10. The kit as in claim 6 wherein said rectangular frame, said downward depending support means, and said angular support means disassemble to members of predetermined lengths.

11. The kit as in claim 6 wherein preselected members are provided preassembled so as to expedite erection.

12. A combination comprising:

a motorcycle which includes front and rear wheels, an engine driving the rear wheel, a one or two person saddle type seat, a frame mounted full fairing, a curved windshield, a handlebar assembly operatively connected to, and serving to steer the front wheel, engine guards disposed on either side of said engine and rear baggage guards disposed on either side of said motorcycle, and a removable enclosure assembly for a motorcycle, said enclosure assembly comprising:

first and second pairs of upright support members adapted to being substantially rigidly coupled to said engine guards and said baggage guard of the motorcycle respectively;

a disassemblable first frame element forming a rectangular tubular frame provided with a transverse member, said rectangular frame having a forward and rearward pair of downwardly depending support means, each of said support means adapted to removably engage respective said support members and said rectangular frame;

a pair of angular support means adapted to removably and slidably engage said rectangular frame and said rearward pair of downwardly depending support means; and a top cover component adapted to be removably affixed to said rectangular frame and a windshield of said motorcycle;

wherein said enclosure assembly is adapted for use at up to and including highway speeds.

13. The combination as in claim 12 further comprising a front cover component adapted to be removably affixed to a windshield of a motorcycle, said rectangular frame and said forward pair of downwardly depending support means.

14. The combination as in claim 13 further comprising a side and rear cover component adapted to be removably affixed to said rectangular frame, said forward and rearward pair of downwardly depending support means, and said frontal cover component.

15. The combination as in claim 12 wherein said cover component comprises weather proof fabric material provided with fastening means and further provided with transparent portions at predetermined locations.

16. The combination as in claim 12, wherein said downwardly depending support means comprise extensible tubular members.

* * * * *